(12) United States Patent
Manaker, Jr. et al.

(10) Patent No.: US 7,137,090 B1
(45) Date of Patent: Nov. 14, 2006

(54) PATH SLACK PHASE ADJUSTMENT

(75) Inventors: Walter A. Manaker, Jr., Boulder, CO (US); Salim Abid, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 320 days.

(21) Appl. No.: 10/637,733

(22) Filed: Aug. 8, 2003

(51) Int. Cl.
*G06F 17/50* (2006.01)
*G06F 9/45* (2006.01)
*H03K 19/00* (2006.01)

(52) U.S. Cl. ............................................. 716/6; 716/17
(58) Field of Classification Search .................... 716/6, 716/17
See application file for complete search history.

(56) References Cited

U.S. PATENT DOCUMENTS

| | | | | |
|---|---|---|---|---|
| 5,638,016 | A * | 6/1997 | Eitrheim | 327/175 |
| 5,771,375 | A * | 6/1998 | Mains | 713/503 |
| 5,845,233 | A * | 12/1998 | Fishburn | 702/108 |
| 6,014,510 | A * | 1/2000 | Burks et al. | 703/19 |
| 6,185,723 | B1 * | 2/2001 | Burks et al. | 716/6 |
| 6,209,122 | B1 * | 3/2001 | Jyu et al. | 716/6 |
| 6,401,231 | B1 * | 6/2002 | Belkhale et al. | 716/6 |
| 6,795,954 | B1 * | 9/2004 | Andreev et al. | 716/6 |
| 2005/0065765 | A1 * | 3/2005 | Visweswariah | 703/19 |
| 2005/0066296 | A1 * | 3/2005 | Visweswariah | 716/6 |

OTHER PUBLICATIONS

Habib Youssef, Eugene Shragowitz; "Timing Constraints for Correct Performance"; 1990 IEEE; pp. 24-27.

H.C. Yen; S. Ghanta, H.C. Du; "A Path Selection Algorithm for Timing Analysis"; 1988 IEEE; 25th ACM/IEEE Design Automation Conference; Paper 43.5; pp. 720-722.

Robert B. Hitchcock, Sr.; "Timing Verification and the Timing Analysis Program"; Copyright IEEE; 19th Design Automation Conference; pp. 446-454.

Thomas G. Szymanski; "Computing Optimal Clock Schedules"; Proceedings 29th ACM/IEEE Design Automation Conference; 1992 IEEE; Paper 25.2; pp. 399-404.

Karem A. Sakallah et al., "checkT and minT: Timing Verification and Optimal Clocking of Synchronous Digital Circuits"; IEEE; 1990.

* cited by examiner

*Primary Examiner*—Jack Chiang
*Assistant Examiner*—Magid Y. Dimyan
(74) *Attorney, Agent, or Firm*—W. Eric Webostad (57) ABSTRACT

Method and apparatus for phase-timing compensation is described. More particularly, a clock source and a clock sink of a path are identified for phase-timing compensation for a design. An absolute path slack is obtained, and phase offset of the clock source relative to the clock sink is determined. A normalizing factor responsive to the phase offset is generated. A normalized slack is computed using the absolute path slack and the normalizing factor.

10 Claims, 6 Drawing Sheets

PATH SLACK PHASE ADJUSTMENT

FIELD OF THE INVENTION

One or more aspects of the present invention relate generally to integrated circuit design layout and more particularly, to interconnect delay improvement during placement or routing.

BACKGROUND OF THE INVENTION

Integrated circuit layout software tools for placing and routing ("PAR tools") are well known. Such PAR tools may use static timing analysis to guide a layout process to meet user-specified timing constraints. For example, a user may request that a particular "circuit path" within an integrated circuit have a delay which is less than some specified value. By "circuit path" it is meant an ordered list of logic and interconnect resources, without any repetition of any of such resources. A circuit path starts from a "path source," namely, the first or origination resource of the circuit path, and ends at a "path sink," namely, the last or destination resource of the circuit path.

A static timing analyzer might use logic and interconnect delays along such a circuit path to determine if the total delay along the path is less than the specified value. However, checking each individual path is impractical given the number of individual paths in a conventional complex integrated circuit.

Consequently, block-oriented static timing analysis may be used to find a worst case delay of all paths for a logic block. The worst case delay value is then compared against a specified value. Additionally, worst case "Absolute Slack" of any interconnect resource for all paths passing through such resource may be determined with block-oriented static timing analysis. By "Absolute Slack" it is meant as the difference between a specified time of arrival of a signal to a location and the actual time of arrival of the signal to the location. Notably, for purposes of clarity, Absolute Slack is described in terms of maximum delay requirements as specified by a user. However, absolute slack may be used for minimum delay requirements, or delay requirements between maxima and minima delay requirements, as specified by a user.

However, for clocked circuits, conventional absolute slack computation fails to take into account phase differences of a clock signal relative to path source and sink, and thus may result in a sub-optimal optimization of design clock frequency for an integrated circuit.

Accordingly, it would be both desirable and useful to provide means for accounting for differences of a clock signal relative to path source and sink for placement or routing of an integrated circuit.

SUMMARY OF THE INVENTION

An aspect of the invention is a method for phase-timing compensation for a design, comprising: identifying a clock source and a clock sink of a path; obtaining an absolute path slack for the path; determining phase offset of the clock source relative to the clock sink; generating a normalizing factor responsive to the phase offset; and computing a normalized slack using the absolute path slack and the normalizing factor.

Another aspect of the invention is a method for phase-timing compensation for a design, comprising: identifying a path of the design; identifying an interconnect resource of the path; obtaining a delay specification for the path; obtaining a propagation delay of the interconnect resource; obtaining an arrival time for a path source of the path to the interconnect resource; obtaining a destination time from the interconnect resource to a path sink; determining absolute path slack of the interconnect resource responsive to the arrival time, the destination time and the propagation delay; and normalizing the absolute path slack.

Another aspect of the invention is a method for phase-timing compensation for a design, comprising: obtaining a path of said design; identifying an interconnect resource of said path; obtaining a propagation delay of said interconnect resource; identifying each clock source and each clock sink of said path; determining a destination time from said interconnect resource to each said clock sink; determining a phase-shift offset of each said clock source relative to said clock sink; determining a normalized arrival time of each said clock source to said interconnect resource; determining a phase-shift factor for each said clock source to said interconnect resource respectively responsive to each said phase-shift offset; and determining a normalized slack for said interconnect resource responsive to said phase-shift factor, said normalized arrival time, said propagation delay, and said destination time.

Another aspect of the invention is a method for placement using phase-timing compensation for a design, comprising: obtaining timing specifications for the design; determining normalized slacks responsive to the timing specifications and differences in clock phases thereof; and placing components of the design guided in part by the normalized slacks.

Another aspect of the invention is a method for routing using phase-timing compensation for a design, comprising: placing components of the design; obtaining timing specifications for the design; determining normalized slacks responsive to the timing specifications and differences in clock phases thereof; and routing interconnect for the components placed guided in part by the normalized slacks.

Another aspect of the invention is a system, the system comprising: a processor; and memory coupled to the processor, the memory including a place and route tool, the place and route tool configured to adjust for differences in clock phases in part by calculating normalized slacks.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION OF THE DRAWINGS

Before proceeding, an adjustment in terminology may be useful to enhance clarity. Absolute slack is now the difference between Specified Time and Arrival Time. Arrival Time to a location in a circuit path is the sum of delays of logic and interconnect resources preceding that location in the circuit path. Arrival Time includes an initial phase-shift offset, if any, at the path source, representing the arrival of a clock signal at the path source relative to the path sink. Specified Time to a location in a circuit path is the user-specified time at a path sink, less the sum of delays of logic and interconnect resources succeeding that location in the circuit path. Thus, to summarize, Arrival Time is delay in front of a point on a circuit path, including any clock phase adjustment, and Specified Time is delay behind a point on a circuit path.

Figure 1:
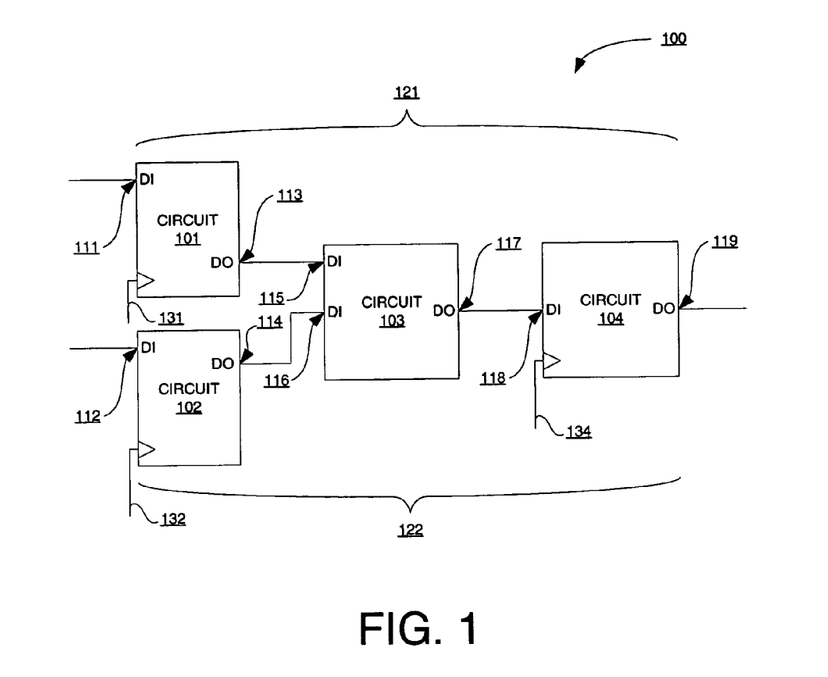
FIG. 1 is a block diagram depicting an exemplary embodiment of a circuit.

FIG. 1 is a block diagram depicting an exemplary embodiment of a circuit 100. Circuit 100 has two circuit paths, namely, a circuit 101-to-circuit 103-to-circuit 104 path ("path 121") and a circuit 102-to-circuit 103-to-circuit 104 path ("path 122"). Circuits 101, 102 and 103 are source synchronous, meaning each of these circuits use a clock signal of substantially the same frequency to operate. For example, clock signal 131 is provided to circuit 101, clock signal 132 is provided to circuit 102, and clock signal 134 is provided to circuit 104. More particularly, each of clock signals 131, 132 and 133 may originate from the same clock source. In other words, clock signals 131, 132 and 133 may be the same clock signal though they may be out-of-phase with respect to one another due to propagation delay differences through respective paths of an integrated circuit.

For a signal propagating along path 121, the signal is received at Data In ("DI") pin 111 of circuit 101, passed through circuit 101, and then output at Data Out ("DO") pin 113 of circuit 101. Thus, there is a delay from time of input at pin 111 to time of output at pin 113 for this logic resource, which delay will be subject to increase due to phase relationship of clock signals, for example clock signal 131 in phase relation to clock signal 134. The signal then travels from pin 113 to pin 115, and there is an associated propagation delay for this interconnect resource. The signal is then received at DI pin 115 of circuit 103, passed through circuit 103, and then output at DO pin 117 of circuit 103. Thus, there is a delay from time of input at pin 111 to time of output at pin 113 for this logic resource, which delay will not be subject to increase due to phase relationship with clock signal 134, as circuit 103 is not clocked. The signal then travels from pin 117 to pin 118, and there is an associated propagation delay for this interconnect resource. Then, the signal is received at DI pin 118 of circuit 104, passed through circuit 104, and then output at DO pin 119 of circuit 104. Thus, there is a delay from time of input at pin 118 to time of output at pin 119 for this logic resource, which delay will be subject to increase due to phase relationship of clock signals.

Similarly, for a signal propagating along path 122, the signal is received at DI pin 112 of circuit 102, passed through circuit 102, and then output at DO pin 114 of circuit 102. Thus, there is a delay from time of input at pin 112 to time of output at pin 114 for this logic resource, which delay will be subject to increase due to phase relationship of clock signals, for example clock signal 132 in phase relation to clock signal 134. The signal then travels from pin 114 to pin 116, and there is an associated propagation delay for this interconnect resource. The signal is then received at DI pin 116 of circuit 103, passed through circuit 103, and then output at DO pin 117 of circuit 103. Thus, there is a delay from time of input at pin 111 to time of output at pin 113 for this logic resource, which delay will not be subject to increase due to phase relationship with clock signal 134, as circuit 103 is not clocked. The signal then travels from pin 117 to pin 118, and there is an associated propagation delay for this interconnect resource. Then, the signal is received at DI pin 118 of circuit 104, passed through circuit 104, and then output at DO pin 119 of circuit 104. Thus, there is a delay from time of input at pin 118 to time of output at pin 119 for this logic resource, which delay will be subject to increase due to phase relationship of clock signals.

To more clearly describe improvement in slack of circuit 100, some sample values are used to describe path slack adjustment of circuit 100. However, it will be apparent that values, other than the ones specifically mentioned, may be used. Furthermore, for clarity, it is assumed that there is no delay due to logic resources, as it will be readily apparent that delays due to logic resources may be taken into account in determining path delay.

For illustration purposes only, let the delay in equivalent units of time for circuit 100 for the interconnect delays are as set forth in Table I.

TABLE I

| From Pin | To Pin | Delay |
|---|---|---|
| 113 | 115 | 3.5 |
| 114 | 116 | 1.5 |
| 117 | 118 | 1.0 |

Notably, these delays in Table I are prior to adjustment. Hence the delay along the path 121 having pins 111, 113, 115, 117, 118 and 119 is 4.5 (3.5+1.0) and the delay along the path 122 having pins 112, 114, 116, 117, 118 and 119 is 2.5 (1.5+1.0). Further assume the source circuit 101 is in phase with sink circuit 104, and the source circuit 102 is 180 degrees out of phase with sink circuit 104. Thus the phase shift offset of source circuit 101 is zero (arrival time at pin 113 equals zero), and the phase shift offset of source circuit 112 is one half the user specified clock period (arrival time at pin 114 equals 2, if the clock period is 4).

Suppose further that the user specified time for paths 121 and 122 is 4 units of delay, i.e., the user specified clock period is 4. For these purposes, Absolute Slack is the difference in Specified Time (i.e., user specified time) and Arrival Time. Accordingly, using the above-described definitions and example units of delay, Arrival Time, Specified Time and Absolute Slack may be determined, as set forth below in Table II.

TABLE II

| At Pin | Arrival Time | Specified Time | Absolute Slack |
|---|---|---|---|
| 113 | 0.0 | −0.5 | −.5 |
| 114 | 2.0 | 1.5 | −.5 |
| 115 | 3.5 | 3.0 | −.5 |
| 116 | 3.5 | 3.0 | −.5 |

From Table II the arrival times are calculated starting at the pin on the source circuit and travelling forward. For example, the arrival time at pin 116 is the arrival time at pin 114 (2 delay units) plus the delay from pin 114 to 116 (1.5 delay units) given by Table I. The specified times are calculated at the sink circuit pin and travelling backwards. For example, the specified time at pin 118 is 4 delay units. The specified time at pin 115 is 4 minus 1 (the delay from pin 117 to 118) which equals 3.0 delay units. Another example is the specified time at pin 113, which is the specified time at 115, i.e., 3.0, minus the delay from pin 113 to 115, i.e., 3.5, which is negative 0.5 (3.0−3.5). Notably, Absolute Slack is indicated as a negative number, which indicates that the user specified time of 4 units of delay is not met, namely, both paths exceed such delay by 0.5 units of delay.

Because clock signal 131 is in phase with clock signal 134, and clock signal 132 is 180 degrees out of phase with respect to clock signal 134, the minimum clock period for path 121 is 4.5 and the minimum clock period for path 122 is 5.0 (a delay of 2.5 times 2) to account for the 180 degree phase shift offset. This phase shift offset is taken into consideration, as described below, in contrast to conventional static timing analyzers.

Accordingly, it should be understood that although two or more interconnects have equivalent Absolute Slacks, or absolute path slacks, reducing slack an equal amount on each path not taking into account differences in phase relationships of clock signals may not result in equivalent contributions to the overall circuit frequency. Thus, a Normalized Slack is computed as a function of phase offset of a path source relative to a path sink. By normalizing Absolute Slack to account for differences in phase relationship, paths may be compared to determine their respective contribution to overall circuit frequency. More particularly, interconnects may be compared to determine where improvement will result in a more significant improvement in circuit frequency.

Continuing the above example, Table III is a restatement of Table II with the addition of Normalized Path Slack.

TABLE III

| At Pin | Arrival Time | Specified Time | Absolute Slack | Normalized Slack |
|---|---|---|---|---|
| 113 | 0.0 | −0.5 | −.5 | −.5 |
| 114 | 2.0 | 1.5 | −.5 | −1.0 |
| 115 | 3.5 | 3.0 | −.5 | −.5 |
| 116 | 3.5 | 3.0 | −.5 | −1.0 |

Thus, because of a 180 degree phase shift, Normalized Slack from pin 114 to pin 116 is twice the Normalized Slack from pin 113 to pin 115, even though these interconnects have the same Absolute Slack.

Normalized Slack further reflects the difference in the minimum period, and thus maximum circuit frequency, obtainable for each interconnect relative to other interconnects. For example, the minimum period for path 121 is the user specified time less the Normalized Slack, which in the above example for paths 121 is 4.5 (i.e., 4−(−0.5)) and for path 122 is 5 (i.e., 4−(−1)). Thus, taking into account Normalized Slack, pin 114 to pin 116 is a better target to improve first to improve frequency of operation of circuit 100. For example, by relocating ("re-placing") circuit 102 relative to circuit 103 or by rerouting pin 114 to pin 116 interconnect to reduce propagation delay by 0.25, pin 114 to pin 116 interconnect would have a 0.5 improvement (i.e., 2x.25) in Normalized Slack, namely, Normalized Slack would be improved to −0.5. After such a change, paths 121 and 122 would both have a minimum period of 4.5 units of delay.

Accordingly, it should be appreciated that Normalized Slack may be used by PAR tools to prioritize interconnects for optimization. Notably, Absolute Slack may still be used to determine absolute error of any path through an interconnect. Thus, Normalized Slacks, as well as Absolute Slacks, generated for user specified maximum allowable delays can account for phase offset of complex clocking relationships that may exist in an integrated circuit design. For interconnects with two or more paths, such as pin 117 to pin 118 interconnect for both of paths 121 and 122, a worst case Normalized Slack for all paths through an interconnect used by two or more paths may be assigned to that interconnect. This assignment provides correct weighting of multi-path interconnects.

Without loss of generality, assume that each interconnect is part of one or more paths, where each path has the same user specified delay. With this assumption, Absolute Slack of an interconnect resource may be defined as, $$SA = TR - (TA + TD) \tag{1}$$

where: R is a user specified delay for a path through the interconnect resource; TD is a maximum propagation delay of the interconnect resource; TA is a maximum time of arrival from all path sources for all paths associated therewith passing through the interconnect resource, including delay(s) TD of any and all predecessor resource(s) between a path source and the interconnect resource for all the paths passing through the interconnect resource; and TR is a minimum of maximum specified time (i.e., R) from all path sinks from the interconnect resource, less delay(s) TD of any and all successor resource(s) between the interconnect resource and a path sink for all the paths passing through the interconnect resource. For computing absolute maximum slack relative to a maximum delay specified, TA is the maximum arrival time of all path sources plus the maximum delays of predecessor resources, and TR is the minimum specified time of all maximum delays specified less the maximum delays of successor resources. Though maximum delay is described, it should be understood, however, with some minor changes the method can be used to compute absolute minimum slack relative to a minimum delay specification. For example, for computing absolute minimum slack relative to a minimum delay specified, TA is the minimum arrival time of all path sources plus the minimum delays of predecessor resources, and TR is the maximum specified time of all minimum delays specified less the minimum delays of successor resources.

Figure 2:
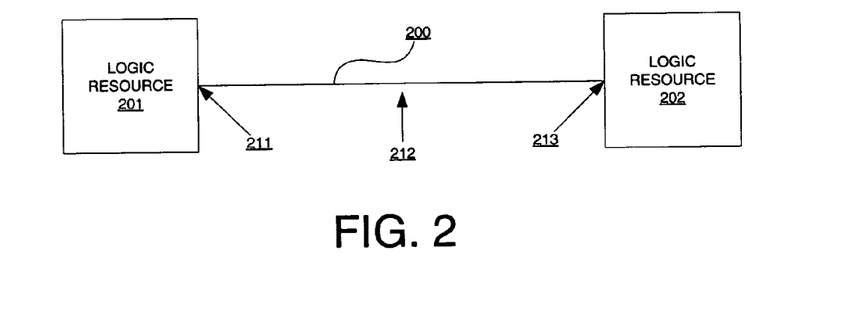
FIG. 2 is a block diagram depicting two logic resources in electrical communication with one another via a path.

To help visualize TA, TD and TR, FIG. 2 is a block diagram depicting two logic resources 201 and 202 in electrical communication with one another via a path 200. Absolute Slack attribute TA is a time at output pin 211 of logic resource 201, and Absolute Slack attribute TR is a time at an input pin 213 of logic resource 202. Absolute Slack attribute TD is a time for a location 212 of an interconnect resource along path 200 between pins 211 and 213.

Again without loss of generality, assume that each interconnect is part of one or more paths, where each path has the same user specified delay. With this assumption, Normalized Slack of an interconnect resource with negative absolute slack may be defined as, $$SN=(TR-(TNA+TD))*TNF \quad (2)$$

where: TNA is a normalized arrival time of all path sources for all paths associated therewith passing through the interconnect resource, when chosen in response to Normalized Slack of the interconnect resource; and TNF is a phase shift factor for all path sources for all paths associated therewith passing through the interconnect resource, when chosen in response to Normalized Slack of the interconnect resource. For example, the normalized arrival time TNA is the arrival time TA associated with a path source having a minimum Normalized Slack. When comparing two or more predecessor resources for a given interconnect resource, an arrival time TA may be selected for propagation which produces the least absolute slack SA for the interconnect resource. Similarly, when comparing two or more predecessor resources of a given interconnect resource, a normalized arrival time TNA and its associated phase shift factor TNF that produces the least normalized slack SN for the interconnect resource may be selected for propagation.

Phase shift factor TNF may be defined as, $$TNF=P/(P-TP)=P/(T2-T1) \quad (3)$$

where TP is a phase-shift offset, if any, associated with a path source of a path relative to a path sink of the path. Phase-shift offset, TP, for a path source may be defined as, $$TP=P-(T2-T1) \quad (4)$$

where: P is the clock period at a path sink of a path (i.e., the clock period of the destination clock), T1 is a launch time of the path source of the path, and T2 is a receive time at the path sink. In other words, the phase shift factor or normalizing multiplier is the clock period of a receiving register divided by available time between a sending register and the receiving register. When the clock input to the sending register is in phase with the clock input to the receiving register, the available time between the sending and receiving registers is a full clock period or P. TNF is therefore the clock period of the destination clock divided by the time available between the source and destination clock signals, i.e., TNF equals P divided by the quantity (T2−T1). Accordingly, for such an example, the normalizing multiplier is 1. However, if phase of the clock input to the sending register is, for example 180 degrees out-of-phase with respect to the clock input of the receiving register, then available time between the two registers is a half-clock period or P/2. For an embodiment where T2 equals P and T1 equals P/2, the normalizing factor TNF equals P/(P−P/2) or 2. Accordingly, for such an example, the normalizing multiplier is 2. Furthermore for example, when phase of the clock input to the sending register is 270 degrees out-of-phase with respect to the clock input of the receiving register, then available time between the two registers is a quarter-clock period or P/4. For an embodiment where T2 equals P and T1 equals 3P/4, TNF equals P/(P−3P/4) or 4. Accordingly, the normalizing multiplier is 4.

Continuing the above example, for two-phase clocking using the same clock signal, launch time T1 equals P/2 because the path source is 180 degrees out of phase with respect to the path sink. Receive time T2 equals P for setup checking relative to a next clock cycle, and thus phase-shift operator TP for two-phase clocking equals P/2. This formulation for phase-shift operator TP may be used for related clocks where the period, launch/send time, and receive time are all known. Notably, T1 and T2 may be chosen to minimize launch to receive cycle time between a path source and a path sink of a path.

For an interconnect resource with positive absolute slack, an inverse relationship between absolute and normalized slack exists, and consequently Normalized Slack is defined as:

$$SN=(TR-(TNA+TD))/TNF \quad (5)$$

Figure 1A:
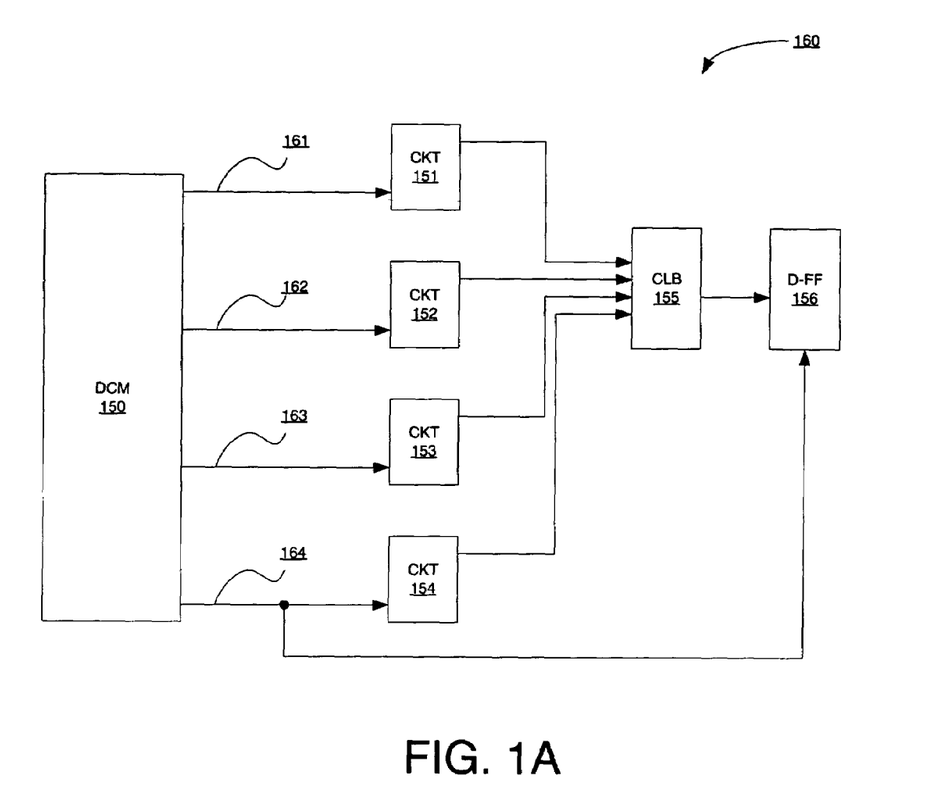
FIG. 1A is a block diagram depicting a portion of a programmable logic device.
Figure 1B:
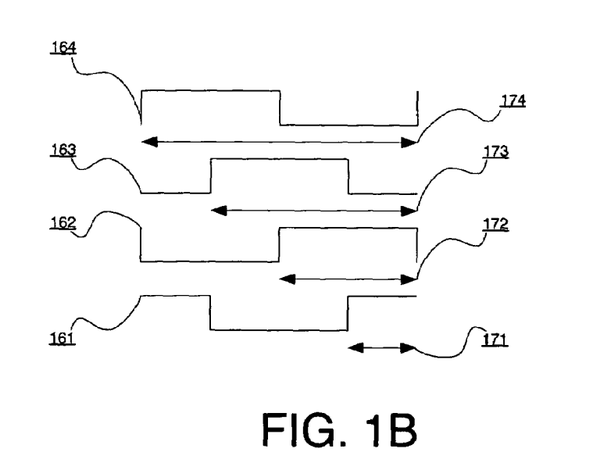
FIG. 1B is a timing diagram for the programmable logic device portion of FIG. 1A.

FIG. 1A is a block diagram depicting a portion of a programmable logic device 160. FIG. 1B is a timing diagram for the programmable logic device 160 portion of FIG. 1A. With simultaneous reference to FIGS. 1A and 1B, an example of timing for programmable logic device 160 is described. Notably, though a programmable logic device is described, any integrated circuit with two or more clocks having phase difference may be used.

From a digital clock module ("DCM") 150, four clock signals are provided, namely, clock signals 161, 162, 163 and 164. Clock signals 161, 162, 163 and 164 respectively are provided to circuits 151, 152, 153 and 154. Outputs of circuits 151, 152, 153 and 154 are provided to configuration logic block ("CLB") 155, and the output of CLB 155 is provided to flip-flop 156 as data input. Input clock to flip-flop 156 is clock signal 164.

Accordingly, clock signal 164 to CLB 155 and flip-flop 156 are in-phase, and thus there is a full period 174 of available cycle time. Clock signal 163 is 90 degrees out-of-phase with clock signal 164 to flip-flop 156, and thus there is a three-quarter period 173 of available cycle time. Clock signal 162 is 180 degrees out-of-phase with clock signal 164 to flip-flop 156, and thus there is a half-period 172 of available cycle time. Lastly, clock signal 161 is 270 degrees out-of-phase with clock signal 164 to flip-flop 156, and thus there is a one-quarter period 171 of available cycle time. Accordingly, each of these paths on which clock signals travel to CLB 155 has an available cycle time which depends on launching and receiving clock times. Using a destination clock period of P, Table IV lists normalizing multipliers for this example.

TABLE IV

| Source Clock | Launch Time | Receive Time | Available Cycle Time | Normalizing Multiplier |
| --- | --- | --- | --- | --- |
| 161 | 3P/4 | P | P/4 | 4 |
| 162 | P/2 | P | P/2 | 2 |
| 163 | P/4 | P | 3P/4 | 4/3 |
| 164 | 0 | P | P | 1 |

Notably, if the absolute slack from each of circuits 151, 152, 153 and 154 to CLB 155 was −1 units of delay, the minimum period for each path would be different. For example, if the interconnect from circuit 151 to CLB 155 has −1 units of slack, then the minimum period of clock signal 164 would be 8 units of delay. This is because an increase in cycle time between clock signal 161 and clock signal 164 by 1 unit of delay to remove timing error corresponds to an increase of 4 units of delay in cycle time for clock signal 164.

Thus, it should be appreciated that the same negative absolute slack one each of the four interconnects from circuits 151, 152, 153 and 154 to CLB 155 have different effects on minimum period of the destination clock signal, namely, clock signal 164. So even though all four interconnections have the same absolute slack value, each of these interconnections had different effects on minimum period of the destination clock signal. However, each of these interconnections will have the same normalized slack of −1 units of delay when their respective absolute slack is multiplied by a corresponding normalizing multiplier, such as from Table IV.

Though destination clock signal is shown as a clock signal going to circuit 164, it need not be so. The destination clock signal may go to one or more interim circuits, such as circuits 151, 152, 153 and 154 and CLB 155, between a clock source, such as DCM 150, and a clock sink, such as flip-flop 156, or go directly from clock sink to clock source.

To recap, Normalized Slack, SN, is equal to a user specified time, TR, less the sum of normalized arrival time TNA and interconnect delay TD multiplied by a phase-shift factor, TNF. To help visualize TNA and TNF, reference is again made to the block diagram of FIG. 2 depicting two logic resources 201 and 202 in electrical communication with one another via a path 200. Normalized arrival time TNA and phase-shift factor TNF are for location 211.

Returning to the above example of FIG. 1, Absolute Slack SA of both interconnects from circuits 101 and 102 to circuit 103 are equal. However, path source of path 122, namely, circuit 102, ("path source 102") has a phase-shift offset of P/2, namely, one-half of the user specified period of R equal to 4 for paths 121 and 122. Accordingly, TP is equal to 2 for path source 102. This yields a normalizing factor TNF equal to 2 from Equation (3), where T2 equals 4, P equals 4 and T1 equals 2. Accordingly, Normalized Slack SN from Equation (2) for pin 114 to pin 116 interconnect is:

$SN=(TR-(TNA+TD))*TNF=(3-(2+1.5))2=-1.$

Normalized Slack SN for pin 113 to pin 115 interconnect is:

$SN=(TR-(TNA+TD))*TNF=(3-(0+3.5))1=-0.5.$

Notably, there is no phase offset as between circuit 101 of path 121 ("path source 101") and circuit 104 of path 121 ("path sink 104"). Accordingly, TNF is equal to 1 as there is no adjustment to be made for a phase difference between path source 101 and path sink 104.

When determining SA and TA for the interconnect from pin 114 to pin 116, a worst case (largest) for each of TA and TD from all sources is obtained. This is done to propagate a worst case SA toward any and all path sinks associated with the interconnect. However, when determining SN for the interconnect from pin 114 to pin 116, the worst case SN is propagated toward any and all path sinks associated with the interconnect. Consequently, a TNA and TNF pair from a path source is propagated toward any and all path sinks associated with the interconnect, as TNA and TNF may come from a different path source than TA in Equation (1), namely, the Arrival Time of the Absolute Slack.

Returning to the above-mentioned example, because the interconnect from pin 113 to pin 115 and the interconnect from pin 114 to pin 116 have the same Absolute Slack SA, either SA value may be propagated to the interconnect from pin 117 to pin 118. However, normalized slack information associated with the interconnect from pin 114 to pin 116, having the worst case normalized slack SN, is propagated to the interconnect from pin 117 to pin 118.

Continuing the above example, TD from pin 113 to pin 115 is 3.5; TD from pin 114 to pin 116 is 1.5; and TD from pin 117 to pin 118 is 1. Tables V to VI provide values for variables for the above example for pins of FIG. 1.

TABLE V

| At Pin | TP | TA | TNF | TNA |
|---|---|---|---|---|
| 113 | 0.0 | 0.0 | 1.0 | 0.0 |
| 114 | 2.0 | 2.0 | 2.0 | 2.0 |

TABLE VI

| At Pin | TA + TD | SA | TNA + TD | TNF | SN |
|---|---|---|---|---|---|
| 115 | 3.5 | −0.5 | 3.5 | 1.0 | −0.5 |
| 116 | 3.5 | −0.5 | 3.5 | 2.0 | −1.0 |
| 118 | 4.5 | −0.5 | 4.5 | 2.0 | −1.0 |

Notably, for the above example, TD at pin 117 is 3.0, and TD at pin 118 is 4.0. By examination of SN values for respective interconnects at pins 115, 116 and 118, SN values are worst at pins 116 and 118. Thus, these worst case values are targets for improvement, as they have the greatest potential for improvement, namely, reducing delay to improve frequency of operation. Thus, layout tools, such as PAR tools, may use SN values to order locations to reduce delay starting with a worst case SN value. Such an order indicates relative contribution to clock frequency of a circuit.

Figure 3:
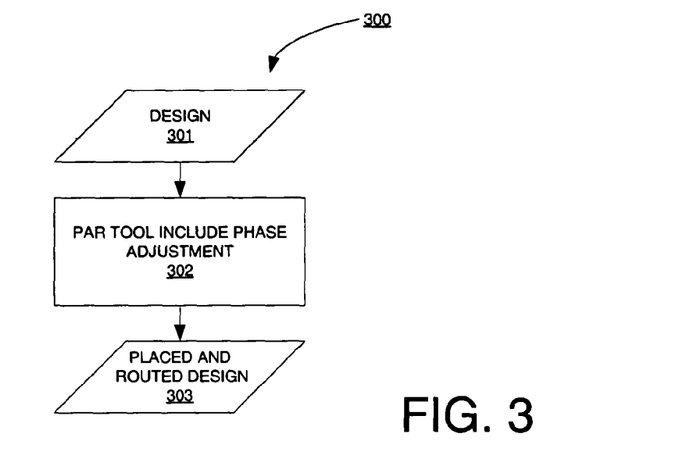
FIG. 3 is a flow diagram depicting an exemplary embodiment of a placement and routing flow.

FIG. 3 is a flow diagram depicting an exemplary embodiment of a placement and routing flow 300. A design 301 is provided to a placement and routing tool 302. Placement and routing tool 302 includes means for determining normalized slack to account for phase adjustment. Phase adjustment may be taken into account during a placement phase, a routing phase, or both a placement and routing phase of operation of placement and routing tool 302.

Figure 4:
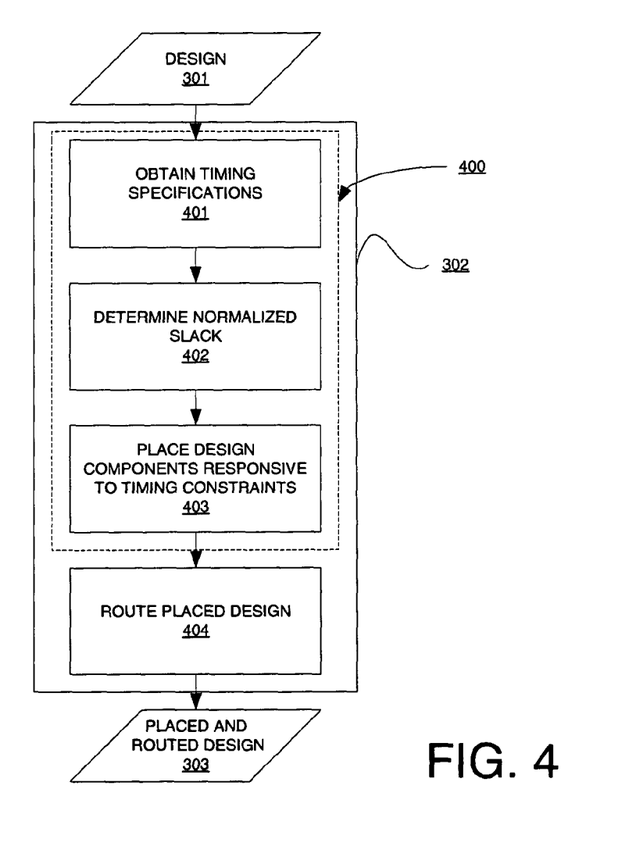
FIG. 4 is a flow diagram depicting an exemplary embodiment of the placement and routing flow of FIG. 3 with a lower-level description of a placement phase.

FIG. 4 is a flow diagram depicting an exemplary embodiment of placement and routing flow 300 of FIG. 3 with a lower-level description of a placement phase 400. Design 301 is obtained by placement and routing tool 302. At 401, timing specifications for design 301 are obtained. Using such timing specifications, as described above, SN is determined at 402. At 403, components of design 301 are placed responsive to timing constraints using SN determined at 402. At 404, the placed design from 403 is routed to provide placed and routed design 303. This routing may be done conventionally, or as described below with reference to FIG. 5.

Figure 5:
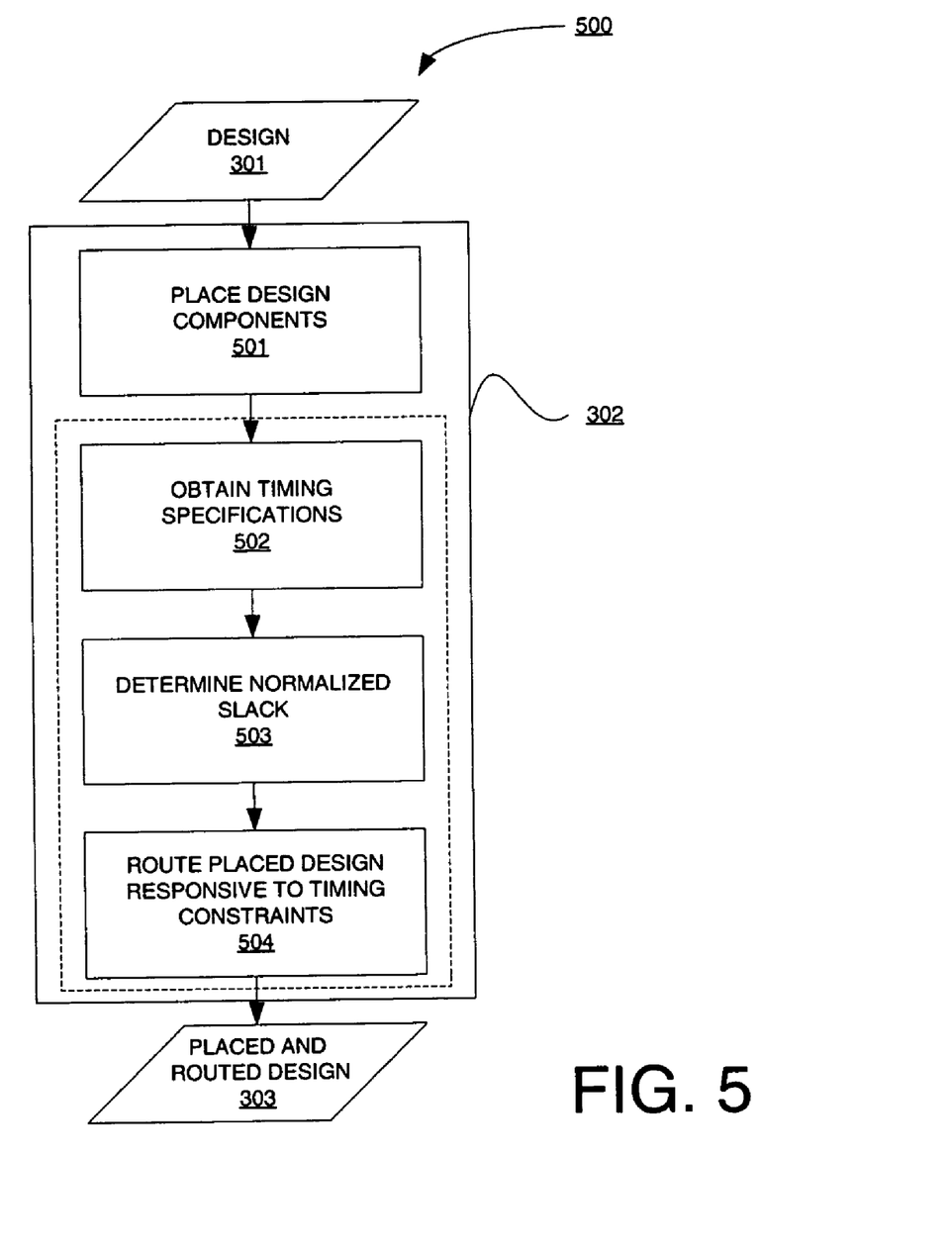
FIG. 5 is a flow diagram depicting an exemplary embodiment of the placement and routing flow of FIG. 3 with a lower-level description of a routing phase.

FIG. 5 is a flow diagram depicting an exemplary embodiment of placement and routing flow 300 of FIG. 3 with a lower-level description of a routing phase 500. Design 301 is obtained by placement and routing tool 302. At 501, components of design 301 are placed. This placement may be done in a conventionally, or as described above with reference to FIG. 4. At 502, timing specifications for design 301 are obtained. Using such timing specifications, as described above, SN is determined at 503. At 504, components of design 301 are routed responsive to timing constraints using SN determined at 503 to provide a placed and routed design 303.

Figure 6:
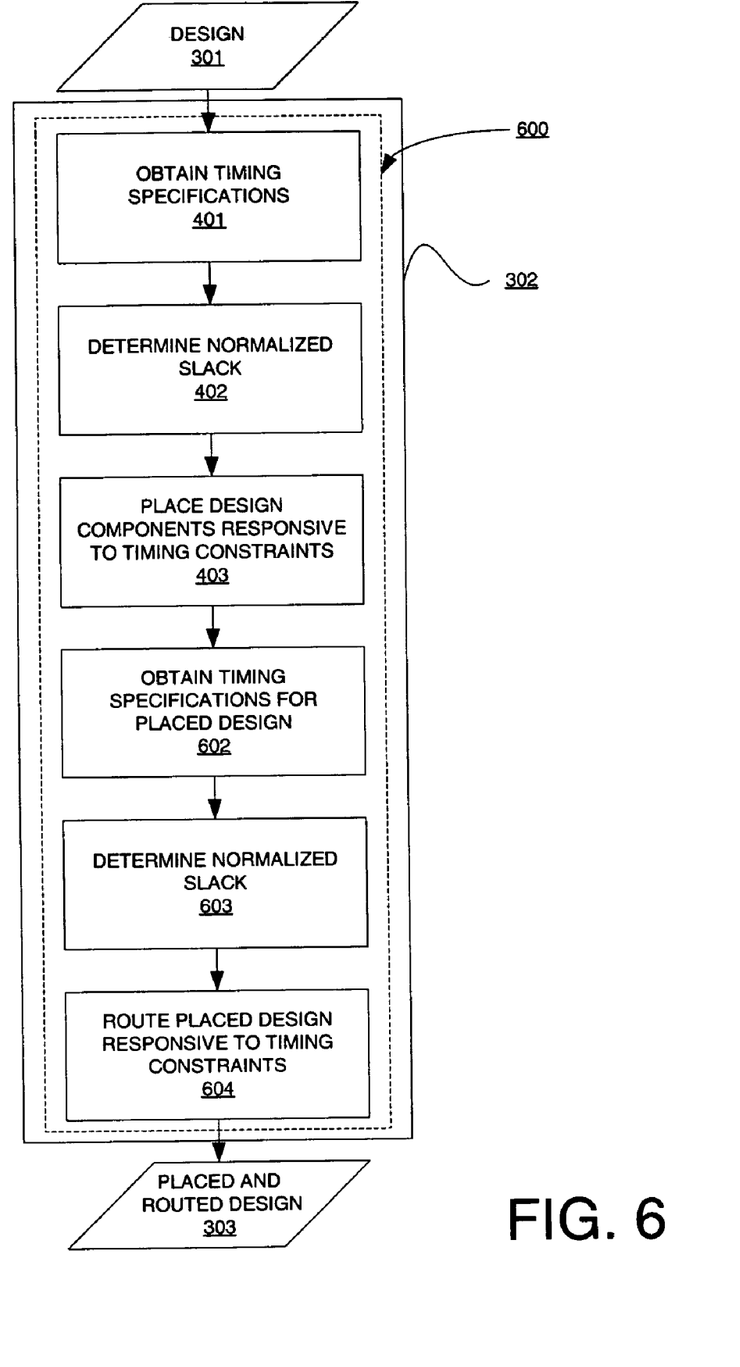
FIG. 6 is a flow diagram depicting an exemplary embodiment of placement and routing flow of FIG. 3 with a lower-level description of placement and routing phases.

FIG. 6 is a flow diagram depicting an exemplary embodiment of placement and routing flow 300 of FIG. 3 with a lower-level description of placement and routing phases 600. Design 301 is obtained by placement and routing tool 302. At 401, timing specifications for design 301 are obtained. Using such timing specifications, as described above, SN is determined at 402. At 403, components of design 301 are placed responsive to timing constraints using SN determined at 402. At 602, timing specifications for a placed design are obtained. Using such timing specifications, as described above, SN is determined at 603. At 604, components of design 301 are routed responsive to timing constraints using SN determined at 603 to provide a placed and routed design 303.

Additionally, it should be appreciated that design synthesis used to provide design 301 may be guided in part by SN. Furthermore, a mapping operation preceding PAR may be guided in part using SN.

Figure 7:
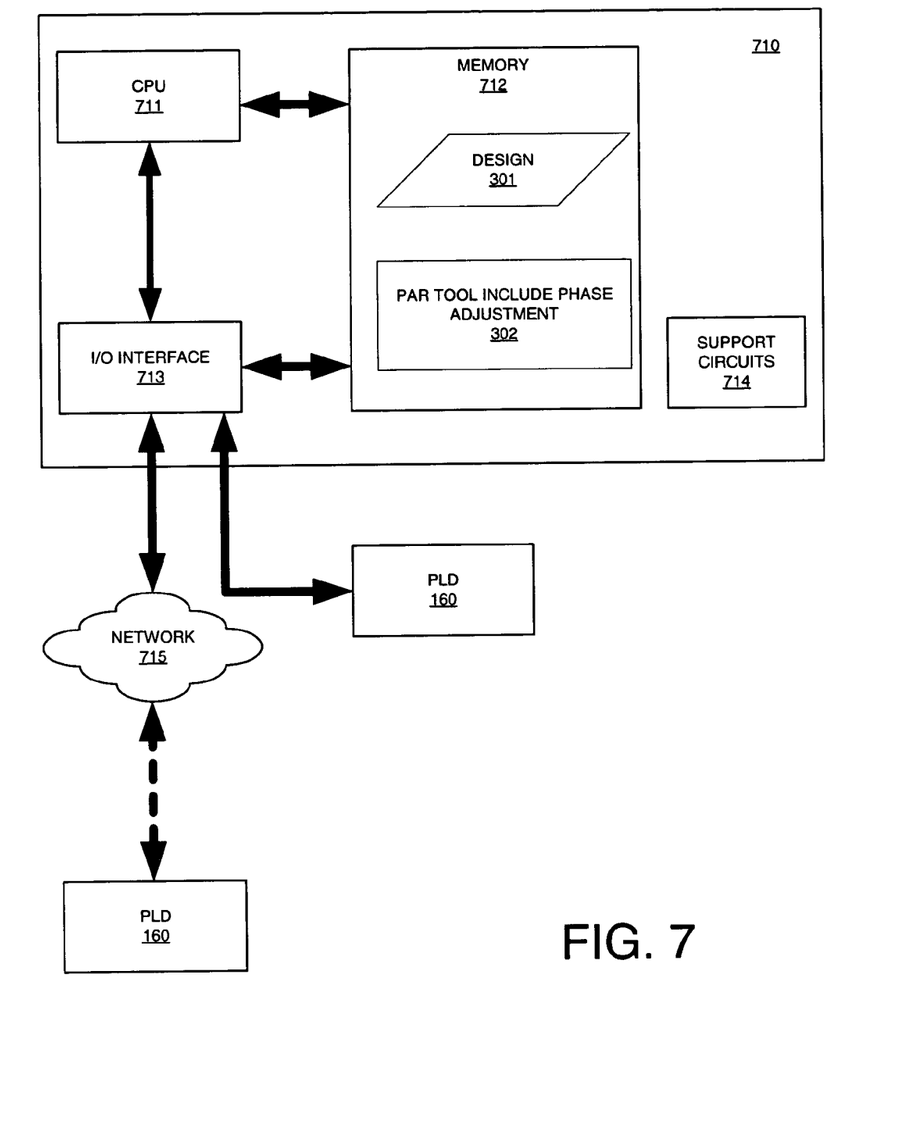
FIG. 7 is a high-level block diagram of an exemplary embodiment of a programmed computer.

FIG. 7 is a high-level block diagram of an exemplary embodiment of a programmed computer 710. Programmed computer 710 includes a central processing unit (CPU) 711, memory 712, a variety of support circuits 714, and an input/output (I/O) interface 713. CPU 711 may be any type of microprocessor known in the art. Support circuits 714 for CPU 711 include conventional cache, power supplies, clock circuits, data registers, I/O interfaces, and the like. Memory 712 may be directly coupled to CPU 710 or coupled through I/O interface 713, and I/O interface may be coupled to a conventional keyboard, network 715, mouse, display printer, and interface circuitry adapted to receive and transmit data, such as data files and the like.

Memory 712 may store all or portions of one or more programs or data to implement processes in accordance with one or more aspects of the invention. Additionally, those skilled in the art will appreciate that one or more aspects of the invention may be implemented in hardware, software, or a combination of hardware and software. Such implementations may include a number of processors independently executing various programs and dedicated hardware, such as application specific integrated circuits (ASICs).

Programmed computer 710 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in memory 712. Memory 712 may include one or more of the following random access memory, read only memory, magneto-resistive read/write memory, optical read/write memory, cache memory, magnetic read/write memory, and the like, as well as signal-bearing media as described below.

Memory 712 may store all or a portion of a design 301, which may be wholly or partially configured in a programmable logic device 160 by programmed computer 710 via input/output interface 713, either directly or optionally over network 715. Memory 712 may store all or a portion of PAR tool 302. One or more aspects of the invention are implemented as program products for use with computer 710, such as PAR tool 302. Program(s) of the program product defines functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-RAM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of one or more aspects of the invention represent embodiments of the invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. For example, although data inputs and outputs are described, type of signal, such as command and address signals, among others, may be used. Claim(s) listing steps do not imply any order of the steps.

The invention claimed is:

1. A method for phase-timing compensation for a design, comprising:
   identifying a clock source for a path;
   identifying a clock sink for the path;
   obtaining an absolute path slack for the path;
   determining phase offset of the clock source relative to the clock sink;
   generating a normalizing factor responsive to the phase offset; and
   computing a normalized slack using the absolute path slack and the normalizing factor.

2. A method for phase-timing compensation for a design, comprising:
   identifying a path of the design;
   identifying an interconnect resource of the path;
   obtaining a delay specification for the path;
   obtaining a propagation delay of the interconnect resource;
   obtaining an arrival time for a path source of the path to the interconnect resource;
   obtaining a destination time from the interconnect resource to a path sink;
   determining absolute path slack of the interconnect resource responsive to the arrival time, the destination time and the propagation delay; and
   normalizing the absolute path slack;
   the normalizing of the absolute slack including:
      determining a phase offset of a clock source of the path relative to the clock sink of the path;
      generating a normalizing factor responsive to the phase offset; and
      multiplying the absolute slack by the normalizing factor.

3. The method, according to claim 2, wherein the propagation delay of the interconnect resource is a maximum propagation delay.

4. The method, according to claim 2, wherein the arrival time comprises a maximum delay of all path sources to the interconnect resource.

5. The method, according to claim 4, wherein the maximum delay is determined taking into account each predecessor resource between the path source and the interconnect resource.

6. The method, according to claim 2, wherein the destination time comprises a minimum of maximum delays from the interconnect resource to all path sinks.

7. The method, according to claim 6, wherein the minimum of maximum delays is determined taking into account each successor resource between the interconnect resource and the path sink.

8. A method for phase-timing compensation for a design, comprising:
 obtaining a path of said design;
 identifying an interconnect resource of said path;
 obtaining a propagation delay of said interconnect resource;
 identifying each clock source and each clock sink of said path;
 determining a destination time from said interconnect resource to each said clock sink;
 determining a phase-shift offset of each said clock source relative to said clock sink;
 determining a normalized arrival time of each said clock source to said interconnect resource;
 determining a phase-shift factor for each said clock source to said interconnect resource respectively responsive to each said phase-shift offset; and
 determining a normalized slack for said interconnect resource responsive to said phase-shift factor, said normalized arrival time, said propagation delay, and said destination time.

9. The method, according to claim 8, wherein each said clock source is a digital clock module configured to provide a plurality of clock signals.

10. The method, according to claim 9, wherein said digital clock module is part of a programmable logic device.

* * * * *